US012667810B2

(12) United States Patent (10) Patent No.: US 12,667,810 B2
Johann et al. (45) Date of Patent: Jun. 30, 2026

(54) DEVICE AND METHOD FOR PROTECTING DRINKING WATER FROM MICROORGANISMS

(71) Applicant: BWT Holding GmbH, Mondsee (AT)

(72) Inventors: Jürgen Johann, Mondsee (AT); Katharina Weitgasser, Wals (AT)

(73) Assignee: BWT Holding GmbH, Mondsee (AT)

( * ) Notice: Subject to any disclaimer, the term of this patent is extended or adjusted under 35 U.S.C. 154(b) by 399 days.

(21) Appl. No.: 18/036,191

(22) PCT Filed: Nov. 4, 2021

(86) PCT No.: PCT/EP2021/080621
§ 371 (c)(1),
(2) Date: May 10, 2023

(87) PCT Pub. No.: WO2022/101084
PCT Pub. Date: May 19, 2022

(65) Prior Publication Data
US 2023/0398492 A1      Dec. 14, 2023

(30) Foreign Application Priority Data
Nov. 12, 2020    (DE) ..................... 10 2020 129 849.8

(51) Int. Cl.
B01D 61/18        (2006.01)
B01D 61/20        (2006.01)
(Continued)

(52) U.S. Cl.
CPC ............. B01D 61/18 (2013.01); B01D 61/20 (2013.01); B01D 63/0241 (2022.08);
(Continued)

(58) Field of Classification Search
CPC .. C02F 1/444; C02F 1/722; C02F 1/00; C02F 1/44; C02F 1/66; C02F 1/003; C02F 1/72; C02F 1/68; C02F 1/42; C02F 2303/20; C02F 9/04; B01D 61/18; B01D 61/20; B01D 61/14; B01D 63/0241; B01D 63/024; B01D 63/02; B01D 2311/2634; B01D 2311/04; B01D 2311/18; B01D 2321/164; B01D 2321/168
(Continued)

(56) References Cited

U.S. PATENT DOCUMENTS

| | | | | |
|---|---|---|---|---|
| 2008/0105618 | A1* | 5/2008 | Beckius | ............ B01D 63/0241 |
| | | | | 210/500.21 |
| 2010/0044321 | A1 | 2/2010 | Frandsen | |

(Continued)

FOREIGN PATENT DOCUMENTS

| | | | | |
|---|---|---|---|---|
| EP | 2733120 | A1 * | 5/2014 | ................ C02F 1/42 |
| EP | 2754642 | A1 | 7/2014 | |

(Continued)

*Primary Examiner* — Akash K Varma
(74) *Attorney, Agent, or Firm* — Smartpat PLC

(57) ABSTRACT

A water filter comprises an ultrafilter or microfilter, in particular a membrane stack for ultrafiltration or microfiltration, which has a direction of flow (D) and contains an alkalinizing and/or oxidative material that is placed upstream of or within the membrane stack when viewed in the direction of flow.

14 Claims, 2 Drawing Sheets

(51) Int. Cl.
    *B01D 63/02*     (2006.01)
    *C02F 1/44*     (2023.01)
    *C02F 1/72*     (2023.01)

(52) U.S. Cl.
    CPC .............. *C02F 1/444* (2013.01); *C02F 1/722* (2013.01); *B01D 2311/2634* (2013.01); *B01D 2321/164* (2013.01); *C02F 2303/20* (2013.01)

(58) Field of Classification Search
    USPC ............................ 210/600, 209, 266, 500.21
    See application file for complete search history.

(56)                    References Cited

U.S. PATENT DOCUMENTS

2010/0051527 A1 *   3/2010   Frandsen .............. B01D 61/18
                                            210/209
2014/0217005 A1 *   8/2014   Takeda ..................... C02F 1/44
                                            210/266

FOREIGN PATENT DOCUMENTS

| EP | 3900813 | A1 | 10/2021 |
| WO | 2008110165 | A1 | 9/2008 |
| WO | 2017021492 | A1 | 2/2017 |
| WO | 2021214333 | A1 | 10/2021 |

* cited by examiner

DEVICE AND METHOD FOR PROTECTING DRINKING WATER FROM MICROORGANISMS

CROSS-REFERENCE TO RELATED APPLICATION

This application is a national stage application, filed under 35 U.S.C. § 371, of International Patent Application No. PCT/EP2021/080621, filed on 4 Nov. 2021, which claims the benefit of German Patent Application No. 10 2020 129 849.8, filed 11 Nov. 2020.

TECHNICAL FIELD

The invention relates to a water filter and to a method for treating drinking water.

BACKGROUND

Drinking water can be provided from different sources, for example from a tank or from a water pipe, depending on the application situation.

During phases of stagnation, there is in particular a risk that microorganisms such as bacteria, fungi, or algae will proliferate in pipes in the water. A stagnation phase is a period during which no water is extracted. Below, the term "microorganisms" refers to both algae and organisms such as bacteria and fungi which can induce processes that are harmful to health.

In order to counteract the proliferation of microorganisms, it has been known from practice to heat the water in a reservoir in order to kill the microorganisms. This may, for example, be accomplished periodically by heating the entire water tank. This procedure is complex and energy-intensive.

Furthermore, microorganisms can also accumulate in particular in the vicinity of the outlet of a water dispenser and obviously cannot be reached by the heated water there, but will be flushed out when the water dispenser is actuated.

In order to remove microorganisms from drinking water, devices and methods for ultrafiltration or microfiltration are known. Bacteria, for example, are generally not able to pass through an ultrafilter. Microfiltration refers to a process for filtration through membranes that have a pore size between 0.1 µm and 1 µm, which means that the majority of bacteria cannot pass through a microfiltration membrane either. In ultrafiltration, by contrast, the pore size is less than 0.1 µm. In particular capillary membranes are known as a filter medium for ultrafiltration or microfiltration, in which case the membrane is defined by the wall of the capillary.

During ultrafiltration or microfiltration, increased bacterial growth or the formation of biofilms may occur on the concentrate side. In this case, microorganisms will accumulate on the membrane during filtration and will become embedded in a matrix of extracellular polymeric substances (EPS). EPS are formed by microorganisms and released into their environment. The composition of the EPS depends on the species involved in the biofilm. The EPS ensure that the microorganisms adhere to the membrane surface and provide for the mechanical and chemical stability of the biofilm. With increasing thickness of the biofilm, the filtration performance of the membrane will decrease. Furthermore, the increased bacterial growth on the concentrate side can lead to uncontrolled reverse or backward germ contamination into the pipe network.

SUMMARY

The present disclosure is based on the object of providing drinking water that is as germ-free as possible. More particularly, it is an object of the disclosure to increase the service life and safety of a membrane filter, in particular of a microfilter or an ultrafilter, and at the same time to protect the pipe system from bacterial backward contamination.

The disclosure seeks to provide a device and a method which ensure that drinking water can be extracted without any contamination by microorganisms, even after a preceding stagnation phase in terms of extraction.

The object is achieved by a water filter and by a method for filtering drinking water as disclosed herein.

A water filter comprises a filtration membrane, in particular an ultrafilter, in particular a membrane stack for ultrafiltration, which has a direction of flow and contains an alkalinizing and/or oxidative material, which is placed directly upstream of or within the membrane space when viewed in the direction of flow. The direct contact of the alkalinizing and/or oxidative material with the membranes directly counteracts the formation of a biofilm.

The alkalinizing and/or oxidative material allows to achieve, for example, an increase in the pH to more than 9, in particular to a pH of more than 10 but preferably less than 13, to achieve a biocidal effect.

Furthermore, the material may have an oxidizing effect, in particular it may form a substance that has an oxidizing effect, such as hydrogen peroxide, for example.

In a further embodiment, the water filter comprises a microfilter, in particular including a membrane stack for microfiltration, which has a direction of flow and contains alkalinizing and/or oxidative material that is placed directly upstream of or within a membrane space when viewed in the direction of flow. The direct contact of the alkalinizing and/or oxidative material with the membranes directly counteracts the formation of a biofilm.

When flowing through the filter, the input water passes through a zone in which a biocidal contact material is present due to the alkalinizing and/or oxidative material. "Biocidal contact material" refers to materials which have a bactericidal and/or fungicidal and/or algicidal effect when coming into contact with water. The placing of the alkalinizing and/or oxidative material on the membrane stack for ultrafiltration or microfiltration prevents the growth of biofilms on the inlet side of the membrane stack.

The alkalinizing and/or oxidative material prevents biofilms from growing into the membrane stack and prevents the membrane stack from becoming intergrown by a biofilm.

With this use of a membrane stack for ultrafiltration or microfiltration, it is possible to dispense with germicidal measures such as dosing silver ions or chlorine to prevent germ growth or other techniques, since these microorganisms cannot pass through the membranes and thus clean water will exit from the filter.

Hence, the water filter can be provided free of silver and/or can be operated without chlorine.

Hence, a water filter with an effect against microorganisms is provided in a surprisingly simple manner. Its biocidal effect is based on an increase in the pH value and/or is due to the oxidative effect of the material that is placed upstream of or in direct contact with the membrane stack.

In a preferred embodiment, the alkalinizing and/or oxidative material is in direct contact with the membrane stack.

With the material placed upstream of or directly on the membrane stack, it is possible to provide virtually germ-free drinking water. Simultaneously with the filtration of the drinking water, the growth of biofilms on the membrane is counteracted. Moreover, drinking water can be reliably extracted without contamination by microorganisms, especially after a preceding stagnation of extraction.

In a further advantageous embodiment, the alkalinizing and/or oxidative material contains at least one material which is selected from the group of carbonates, oxides, or peroxides.

Particularly suitable for use are calcium carbonate, magnesium carbonate, calcium oxide, magnesium oxide, magnesium peroxide, calcium peroxide, sodium peroxide, potassium peroxide, and zinc peroxide, and mixtures of at least two of the materials mentioned.

Especially agglomerated materials which largely prevent the formation of dust are easy to handle. Preferred alkalinizing and/or oxidative material comprises particles having a particle size of less than 5 mm, preferably less than 3 mm, most preferably in the range between 0.2 and 10 mm, preferably between 0.5 millimeters and 2.5 mm.

The particle sizes given above relate to the initial state of the respective alkalinizing and/or oxidative material. An upper limit for the particle size of the material is in particular determined by the desired dissolution kinetics. In principle, the use of powder is also possible. Preferred are materials comprising particles that are larger than micrometers, more preferably larger than 100 micrometers, most preferably larger than 200 micrometers, so that the flow resistance of the material will be reduced compared to a bed consisting of smaller particles.

Such granulated materials dissolve sufficiently slowly in water, so that the pH of the water inside the water filter will be increased only during a stagnation phase in order to establish the desired biocidal effect. Thus, compared to devices without a material placed according to the disclosure, the invention permits to reduce or almost completely prevent the formation of biofilms and the growth of algae in the ultrafilter or microfilter as well as the discharge of microorganisms into the water that is extracted directly following the stagnation phase.

Influence of the pH on Bacterial Growth:

All microorganisms have a pH range within which growth is possible, i.e. an optimum pH range. Most natural environments have a pH between 4 and 9, and the pH optimum of many microorganisms is exactly within this range. The bacteria most commonly found in drinking water, such as *Legionella, Pseudomonas, E. coli* and enterococci, have their pH optimum in exactly this range.

| Bacterium | pH optimum | pH range allowing for growth |
|---|---|---|
| *E. coli* | 7-7.5 | 5.5-9 |
| Enterococci | 7.5 | 4.6-9.9 |
| Legionella | 7 | 5-8.1 |
| Pseudomonas ae. | 7.0-7.5 | 4.5-9.5 |

While the extracellular pH has an impact on the growth of the bacteria, the intracellular pH must remain close to neutrality (with the exception of extremely acidophilic or alkaliphilic bacteria), since DNA is an acid-labile structure and RNA is an alkali-labile structure. If the extracellular pH is outside the pH optimum or outside the range in which growth is still possible (see table), the bacteria will no longer be able to stabilize the intracellular pH value. This will slow down or stop bacterial growth or lead to the death of the bacteria.

As soon as water is extracted through the water filter, the water that has been stagnant in the filter will be mixed with fresh water and the pH value of the extracted water is lowered.

The alkalinizing and/or oxidative material is in particular configured such that after a stagnation phase of 5 hours, the OH concentration increases such that the pH increases to between 10 and 13.

Furthermore, an amorphous silicate material can be admixed into the alkalinizing and/or oxidative material. The silicic acid dissolved in water will stabilize the pH value on the filtrate side.

With ultrafiltration, the pore size is in a range between 0.01 µm and 0.1 µm. In this case, macromolecules, proteins and some viruses will be separated, for example. With microfiltration, the pore size is >0.1 µm. In this case, bacteria, yeasts, particles, etc. will be separated.

Generally, a membrane is used which converts the entire quantity of raw water or input water into filtrate or output water. An advantage of this method is the sterility of the produced filtrate and also the removal of microplastics.

In a preferred embodiment, the filter material comes in the form of a hollow membrane material. The special arrangement of the membranes and the size and shape of the pores in these membranes provides for filtration of ultrafine particles on the surface without noticeably blocking the membrane, which leads to a continuous flow rate in the device so that a pressure difference that might arise downstream of the device is avoided.

In a preferred embodiment, the membranes of the membrane stack come in the form of capillary membranes. In the case of such capillary membranes, the walls of the capillary membranes provide a large surface area through which the medium to be filtered can pass through the ultrafilter or microfilter. In one embodiment, the open ends of the membranes define the permeate side. This means that the capillary membranes are bent over so that the open ends of the membranes form the outlet.

The water to be filtered therefore enters the membranes from the outside and exits through the open end of the capillary membranes. In a further embodiment, the capillary membrane can also be operated in the opposite direction.

The capillary membranes preferably have an average diameter (outer diameter) between 0.5 and 5 mm.

The disclosure furthermore relates to a method for treating drinking water, in particular using a water filter as described above, the drinking water being provided in a water source, in particular a water pipe or a water tank. The method for treating drinking water comprises a stagnation phase during which the drinking water does not emerge from the water source, and an extraction phase during which the drinking water is extracted and replenished from the water source.

The drinking water passes through an alkalinizing and/or oxidative material and through a membrane filter during the extraction phase, in particular through a membrane stack for ultrafiltration or microfiltration. In addition to providing essentially germ-free drinking water, the method according to the invention can be performed for producing a hot or cold beverage, for example.

DETAILED DESCRIPTION

Figure 1:
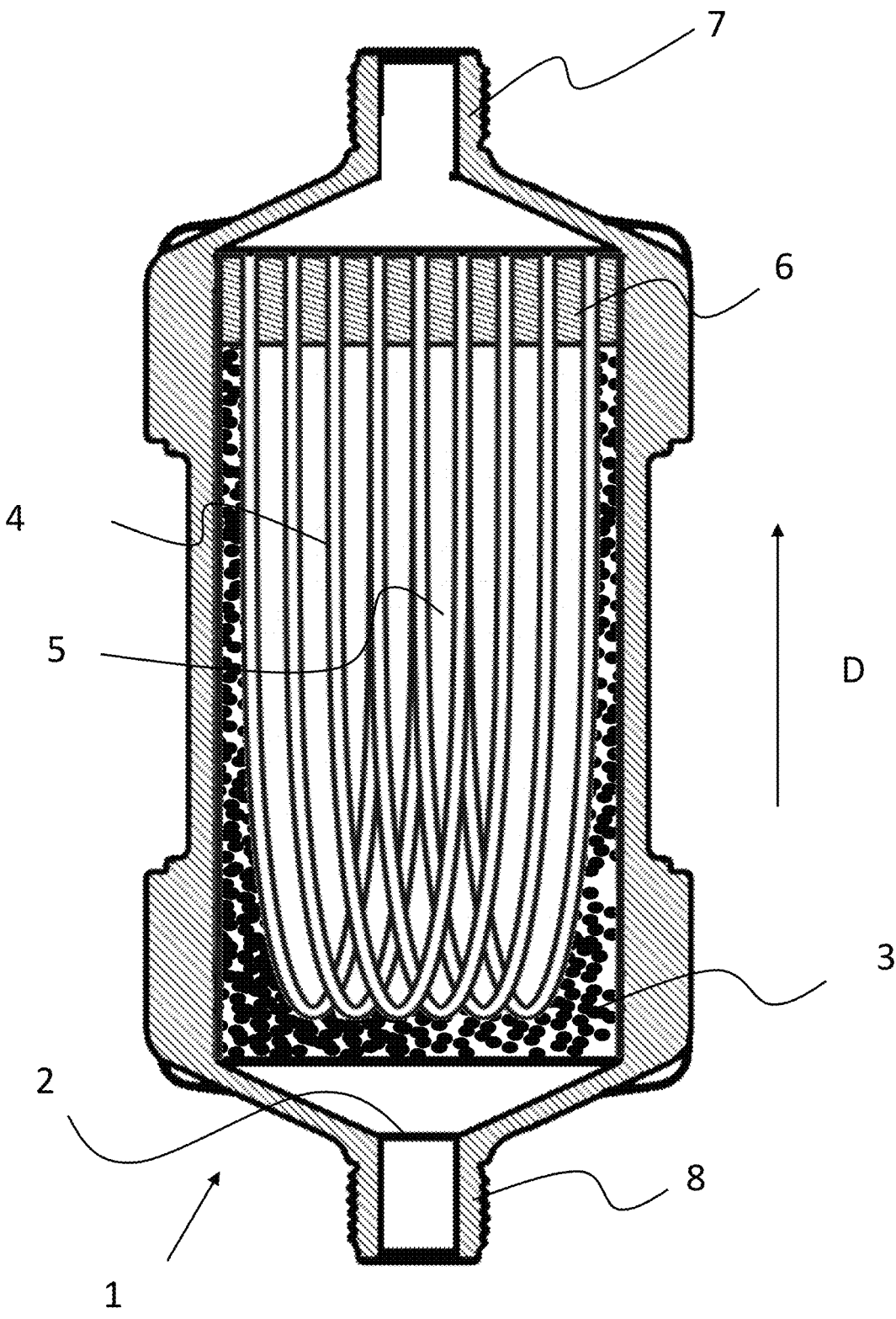
FIG. 1 shows a first embodiment of a water filter.
Figure 2:
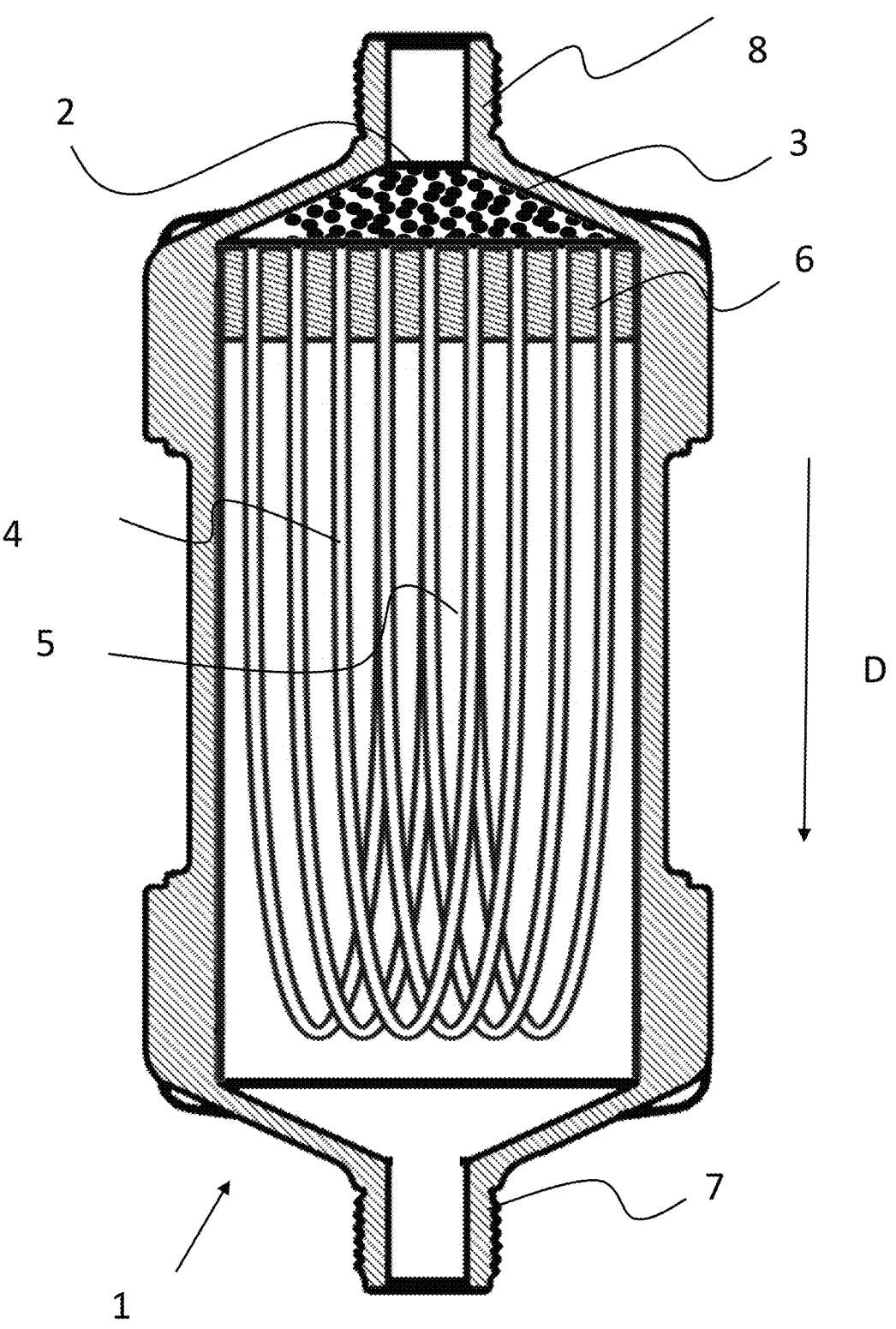
FIG. 2 shows a second embodiment of a water filter

The invention will be illustrated in more detail by way of exemplary embodiments as schematically shown in the drawings of FIGS. 1 and 2.

FIG. 1 shows an embodiment of a water filter 1 in the form of an ultrafilter.

This water filter comprises a housing with an inlet 8 and an outlet 7, thereby defining a direction of flow D.

A membrane stack 5 comprising a plurality of hollow-fiber membranes 4 is arranged inside the housing.

The membrane stack 5 is folded over, and the open ends of the hollow-fiber membranes 4 are retained in a potting compound 6 on the outlet side. Hence, downstream of the inlet 8 the water flows into the hollow-fiber membranes 4 from the outside and exits therefrom at the open ends thereof.

A granular alkalinizing and/or oxidative material 3 is placed directly upstream of the membrane stack 5 and in contact with the membrane stack 5.

Towards the inlet side, the granular material is held back by a screen or retention grid 2.

The water to be filtered flows through the alkalinizing and/or oxidative material 3, then enters the membranes 4 from outside and exits therefrom through the open ends of the capillary membranes.

During stagnation phases, the membranes 4 are protected from contamination on the inlet side by the material 3 which has an alkalinizing and/or oxidizing effect. More particularly, it counteracts the formation of a biofilm that might be caused due to a growth of the germs which are held back by the membranes 4.

FIG. 2 shows another embodiment, in which the alkalinizing and/or oxidative material 3 is placed upstream of the open ends of the membrane stack 5 or in contact therewith.

The water to be filtered flows through the alkalinizing and/or oxidative material 3 and enters the membranes through the open ends of the capillary membranes 4 and exits therefrom through the outer surface of the capillary membranes 4.

The embodiment according to FIG. 2 is therefore similar to the embodiment shown in FIG. 1, while the water filter 1 is operated in the opposite direction of flow. This embodiment, too, comprises a retention grid on the inlet side.

LIST OF REFERENCE NUMERALS

1 Water filter
2 Retention grid
3 Alkalinizing and/or oxidative material
4 Capillary membrane
5 Membrane stack
6 Potting compound
7 Outlet
8 Inlet
D Direction of flow

What is claimed is:

1. A water filter (1), comprising:
a membrane filter with a membrane stack (5),
wherein the membrane filter has a direction of flow (D) and comprises an alkalinizing and/or oxidative material (3), wherein the alkalinizing and/or oxidative material (3) is placed directly upstream of the membrane stack (5) or within the membrane stack (5) and in contact therewith.

2. The water filter as in claim 1,
wherein the membrane filter is an ultrafilter or microfilter.

3. The water filter as in claim 2,
wherein the alkalinizing and/or oxidative material (3) is placed upstream of the ultrafilter or microfilter.

4. The water filter as in claim 1,
wherein the alkalinizing and/or oxidative material (3) is placed within the membrane stack (5) and in contact therewith.

5. The water filter (1) as in claim 1,
wherein the membrane stack (5) comprises a plurality of hollow-fiber membranes for ultrafiltration or microfiltration, the plurality of hollow-fiber membranes having open ends at an outlet side of the water filter (1).

6. The water filter (1) as in claim 1,
wherein the alkalinizing and/or oxidative material (3) contains at least one material selected from the group consisting of oxides, carbonates, and peroxides.

7. The water filter (1) as in claim 1,
wherein the alkalinizing and/or oxidative material (3) comprise one or more of magnesium peroxide, calcium peroxide, sodium peroxide, potassium peroxide, and zinc peroxide.

8. The water filter (1) as in claim 1,
wherein the alkalinizing and/or oxidative material (3) comprise calcium carbonate and/or magnesium carbonate.

9. The water filter (1) as in claim 1,
wherein the alkalinizing and/or oxidative material (3) comprise calcium oxide and/or magnesium oxide.

10. The water filter (1) as in claim 1,
wherein the alkalinizing and/or oxidative material (3) comprises particles having a particle size in a range between 0.5 millimeters and 2.5 millimeters.

11. The water filter (1) as in claim 5,
wherein the alkalinizing and/or oxidative material (3) is arranged in form of a loose bed upstream of or within the membrane stack (5) and in contact therewith.

12. The water filter (1) as in claim 1,
wherein the alkalinizing and/or oxidative material (3) is present in a form of a loose bed.

13. The water filter (1) as in claim 1,
wherein the water filter has an inlet side (8) and an outlet side (7),
wherein the inlet side is configured for being connected to a water pipe or a water tank.

14. The water filter (1) as in claim 1,
wherein the water filter is configured for being used as a filter cartridge for a machine for preparing hot and/or cold beverages, and/or for an under-sink water filter.

* * * * *